Nov. 1, 1938.   L. I. SIEVEN   2,135,415
MEANS FOR EXPANDING PISTON RINGS
Filed June 28, 1937
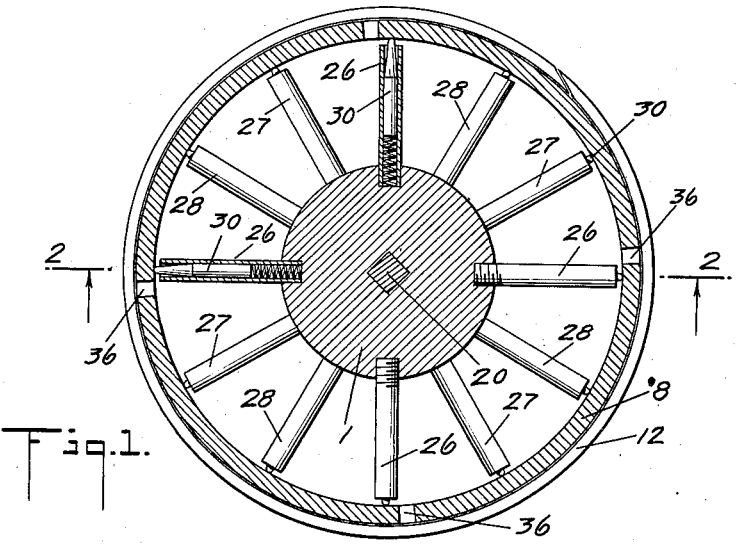
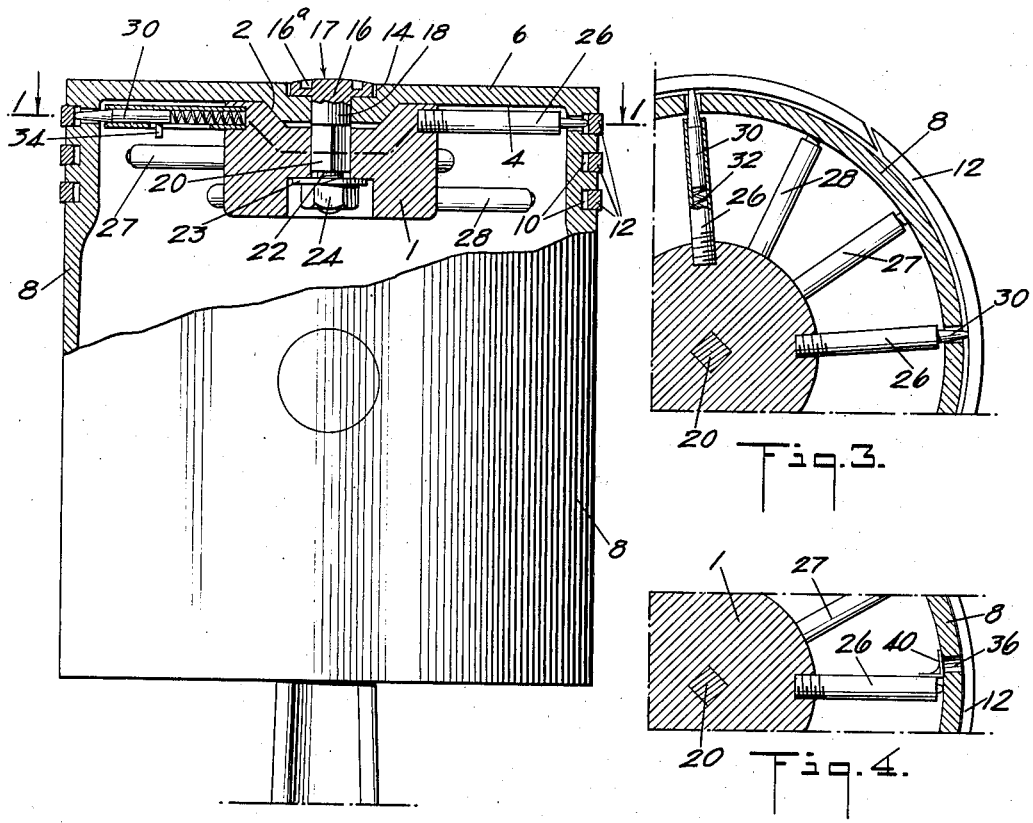
INVENTOR
LOUIS I. SIEVEN
BY HIS ATTORNEYS
Howson and Howson Patented Nov. 1, 1938

2,135,415

UNITED STATES PATENT OFFICE 2,135,415

MEANS FOR EXPANDING PISTON RINGS

Louis I. Sieven, Brooklyn, N. Y.

Application June 28, 1937, Serial No. 150,829

8 Claims. (Cl. 309—42)

This invention relates to internal combustion engines and more particularly to means for expanding the piston rings of internal combustion engines and it is an object of this invention to provide an improved means for expanding the piston rings of internal combustion engines which can be installed when the engine is assembled but held in an inoperative position until needed and it is a further object of this invention to provide a means of the type described which can be rendered when desired without dismantling the engine.

In the drawing:

Fig. 1 is a transverse sectional view of a piston for an internal combustion engine equipped with a means for expanding the piston rings thereof in accordance with this invention, the means for expanding the piston rings being shown in inoperative position;

Fig. 2 is a view of the structure of Fig. 1 partly in elevation and partly in vertical section on the line 2—2 of Fig. 1, the means for expanding the piston ring being shown in operative position;

Fig. 3 is a fragmentary view, similar to Fig. 1, showing the means for expanding the piston rings in operative position; and Fig. 4 is a fragmentary view similar to Fig. 1 and showing in inoperative position a means of slightly modified construction.

In internal combustion engines the loss in engine efficiency with increased wear of the piston rings renders some method of expanding worn or old piston rings desirable when wear occurs to a sufficient extent that leakage past the pistons becomes excessive, but inasmuch as piston rings, when new or not greatly worn, have sufficient resiliency to prevent leakage past the piston without the necessity of means for expanding the rings, it is also desirable that the means for expanding the piston rings be of such a construction that it can be inserted when the engine is assembled but held inoperative until the pistons wear sufficiently to make the use of expanding means desirable and then operated without necessitating dismantling of the engine.

As shown in the drawing, a device constructed in accordance with this invention comprises a cylindrical center piece or hub 1 having a face 2 thereof shaped to fit the central portion of the inner face 4 of the head 6 of a piston 8 which is provided with the usual slots 10 in which are placed the usual piston rings 12. The head 6 of the piston 8 is recessed, as at 14, to receive the head 16 of a bolt 17, having a stem which comprises a cylindrical portion 18 which fits a correspondingly shaped opening in the piston head 6 and an angularly shaped portion 20 which fits a correspondingly shaped opening in the hub 1. The lower end of the bolt is of reduced diameter and threaded, as at 22 to receive a split washer 23 and nut 24 which serve to secure the center piece 1 against the face 4 of the piston head 6 so tightly that friction prevents rotation of the hub 1 with respect to the piston during operation of the engine.

Secured to the hub 1 so as to project radially therefrom are the sets of tubes 26, 27 and 28, each set comprising a plurality of tubes uniformly spaced about the hub 1 and positioned in line with a piston ring groove, the tubes of each set being staggered with respect to the tubes of each of the other sets. In each tube is a plunger 30 which tapers to a point at its outer end and which is pressed outwardly by a spring 32 held under compression between the plunger 30 and the hub 1. Pins 34, fixed in the plungers 30 and projecting slightly through slots in the tubes, limit the outward movement of the plungers. Holes 36 extending through the piston 8 in line with the piston ring grooves 10 and spaced uniformly about the piston in accordance with the spacing of the tubes 26, 27 and 28 permit the plungers 30 to be projected through the piston 8 by the springs 32 when the plungers 30 are alined with the openings 36 so that the plungers are forced into engagement with the piston rings 12, expanding the piston rings and holding the piston rings in effective sealing engagement with the cylinder wall.

When the engine is assembled the hub 1 is placed so that the plungers 30 engage the inside of the piston a short distance to one side of the openings 36 and the bolt 17 holds the hub against the piston head 6 so that friction between the inner face 4 of the piston head and the hub 1 and between the plungers and the piston holds the hub against rotation during operation of the engine. When the piston rings wear so as to permit excessive leakage along the cylinder wall, the spark plug is removed, a wrench inserted and engaged in the recesses 16ª in the head 16 of the bolt 17 and the bolt 17 turned to rotate the hub 1 and tubes 26, 27 and 28 until the plungers 30 are projected through the openings 36 in the piston 8 to expand the piston rings 12.

Where it is desired to seal the openings 36 prior to inserting the plungers 30 therein so as to prevent any leakage past the piston rings and through the openings 36, the tubes 26, 27 and 28 may be provided with laterally projecting lips which cover the openings 36 while the hub 1, and tubes 26, 27 and 28 are positioned so that the plungers 30 do not engage in the openings 36.

What is claimed is:

1. The combination with a hollow piston having piston ring grooves, piston rings in said grooves and openings through said piston to said grooves, of a hub, means securing said hub in said piston for rotation about the longitudinal axis of said piston, reciprocable plungers carried by said hub and held withdrawn from said openings in said piston, springs for forcing said plungers outwardly and means for rotating said hub and plungers to a position in which said springs project said plungers through said openings to expand said piston rings.

2. The combination with a hollow piston having piston ring grooves, piston rings in said grooves and openings through said piston to said grooves, of a hub, means securing said hub in said piston for rotation about the longitudinal axis of said piston, tubes carried by said hub, plungers mounted for reciprocation in said tubes and springs in said tubes for projecting said plungers through the openings in said piston to expand said piston rings.

3. The combination with a hollow piston having piston ring grooves, piston rings in said grooves and openings through said piston to said grooves, of a hub, means securing said hub in said piston, said means permitting relative rotation of said hub and piston, radially projecting tubes mounted on said hub, plungers mounted in said tubes and means for projecting said plungers through said openings when alined therewith to expand said piston rings.

4. The combination with a hollow piston having piston ring grooves, piston rings in said grooves and openings through said piston to said grooves, of a hub, means securing said hub to the inside of said piston for rotation about the longitudinal axis of said piston, radially projecting tubes carried by said hub and arranged for alinement with the openings in said piston, plungers mounted in said tubes and means for projecting said plungers through said openings to expand said rings.

5. The combination with a hollow piston having piston ring grooves, piston rings in said grooves and openings through said piston to said grooves, of a hub, means securing said hub to the inside of said piston for rotation about the longitudinal axis of said piston, said means engaging said piston and hub to yieldingly oppose rotation of said hub, radially projecting tubes carried by said hub and arranged for alinement with the openings in said piston, plungers mounted in said tubes and means for projecting said plungers through said openings to expand said rings, said securing means being arranged for operation of said hub to aline said plungers with the openings in said piston.

6. The combination with a hollow piston having piston ring grooves, piston rings in said grooves and openings through said piston to said grooves, of a hub, means securing said hub to the inside of said piston for rotation about the longitudinal axis of said piston, radially projecting tubes carried by said hub and arranged for alinement with the openings in said piston, plungers mounted in said tubes and means for projecting said plungers through said openings to expand said rings, said tubes having means for closing the openings in said piston.

7. The combination with a hollow piston having piston ring grooves, piston rings in said grooves and openings through said piston to said grooves, of a hub, means securing said hub in said piston for rotation about the longitudinal axis of said piston, plungers carried by said hub and held inactive by said piston, means to rotate said hub and plungers to position said plungers for insertion into the openings in said piston and means to project said plungers through said openings to expand said piston rings.

8. The combination with a hollow piston having piston ring grooves, piston rings in said grooves and openings through said piston to said grooves, of a hub, means pivotally supporting said hub in said piston, tubes projecting radially from said hub, means on said tubes for closing the openings in said piston, plungers mounted in said tubes, means for rotating said hub to shift said closing means from said openings and to aline said tubes with said openings and means for projecting said plungers through said openings to expand said piston rings when said tubes aline with said openings.

LOUIS I. SIEVEN.